United States Patent [19]

Berthold

[11] Patent Number: 5,035,511
[45] Date of Patent: Jul. 30, 1991

[54] DISTRIBUTED FIBER OPTIC TEMPERATURE SENSOR BASED ON TIME DOMAIN TRANSMISSION

[75] Inventor: John W. Berthold, Salem, Ohio

[73] Assignee: The Babcock & Wilcox Company, New Orleans, La.

[21] Appl. No.: 507,325

[22] Filed: Apr. 10, 1990

[51] Int. Cl.⁵ ............................................. G01K 11/00
[52] U.S. Cl. ................................ 374/124; 250/227.12; 374/131; 374/137
[58] Field of Search ............... 374/124, 131, 137, 166, 374/167; 250/227.12; 356/73.1, 43

[56] References Cited

U.S. PATENT DOCUMENTS

| | | | |
|---|---|---|---|
| 4,297,656 | 10/1981 | Pan | 250/227.12 |
| 4,326,798 | 4/1982 | Kahn | 374/127 |
| 4,671,604 | 6/1987 | Soref | 250/227.12 |
| 4,830,513 | 5/1989 | Grego | 374/131 |
| 4,878,226 | 10/1989 | McQuoid et al. | 374/166 |
| 4,916,643 | 4/1990 | Ziegler et al. | 374/166 |

FOREIGN PATENT DOCUMENTS

| | | | |
|---|---|---|---|
| 0076826 | 6/1977 | Japan | 250/227.12 |
| 0140031 | 6/1989 | Japan | 374/131 |

OTHER PUBLICATIONS

Spillman, Jr., W. B. and Lord, J. R., "Self-Referencing Multiplexing Technique for Fiber-Optic Intensity Sensors", J. of Lightwave Technology, vol. LT-5, pp. 865-869, 1987.
Johnson, L. M. et al., "Integrated Optical Temperature Sensor," Appl. Phys. Lett., vol. 41, No. 2 (Jul. 1982).
Callahan, R. W., "Optical Delay Line Compressor," IBM Technical Disclosure Bulletin, vol. 14, No. 8 (Dec. 1971).

*Primary Examiner*—William A. Cuchlinski, Jr.
*Assistant Examiner*—Diego F. F. Gutierrez
*Attorney, Agent, or Firm*—Vytas R. Matas; Robert J. Edwards; Daniel S. Kalka

[57] ABSTRACT

An apparatus and method for sensing temperature of a surface comprises a plurality of time domain intensity transmission networks. Each network comprises pairs of fiber optic power dividers which are connected to each other by bridges. One power divider in each pair is connected in a series by delay lines that form an output bus for propagating a light pulse supplied to an initial power divider in the output bus. This produces a train of light pulses which are returned to a light detector by a receiving bus which interconnects the power dividers at the opposite end of each bridge. Each power divider is in thermal contact with the surface whose temperature is to be measured and the intensity of the train of light pulses is changed in accordance with changes in the temperature of the surface.

7 Claims, 1 Drawing Sheet

DISTRIBUTED FIBER OPTIC TEMPERATURE SENSOR BASED ON TIME DOMAIN TRANSMISSION

FIELD AND BACKGROUND OF THE INVENTION

The present invention relates in general to temperature sensors, and in particular to a new and useful apparatus and method of measuring temperature using time domain intensity transmission.

A number of methods may be used to measure temperature distribution throughout large area panels such as found, for example, in airplane wings. These methods include ultrasonic thermometry, optical time domain reflectometry, multiple point discrete sensing, and time domain intensity transmission, which is the subject of the present invention.

Ultrasonic thermometry is based on the measurement of changes in sound propagation through a material as a function of temperature. This technique was first applied at Babcock & Wilcox, a McDermott Company (B & W) about 30 years ago and technical refinements and extensions have continued to date. B & W has routinely applied ultrasonic thermometry to measure temperature distributions over large areas, in short time intervals, in support of thermal-hydraulic and heat transfer research programs.

Distributed temperature sensing based on optical time domain reflectometry takes advantage of temperature dependent losses in optical fibers. These losses may result, for example, from temperature dependent microbends along the fiber length. If a single fiber is interrogated by a short optical input pulse, the arrival time of reflected return pulses corresponds to specific positions along the fiber length. The magnitude of the reflected return pulses may be used to determine the magnitude of microbend loss and thus temperature at these specific positions.

Multiple point discrete temperature sensing is achieved by multiplexing onto a single light bus, the signals from optical fibers end-coated with silicon-film temperature sensors. B & W has demonstrated the critical technologies required to implement this technique originally demonstrated by others.

An article entitled "Self-referencing Multiplexing Technique for Fiber-Optic Intensity Sensors", by Spillman and Lord, J. of Lightwave Technology, Vol. LT-5, No 7, July 1987, discloses a sensor which can be used for sensing various parameters including temperature, which comprises a self-referencing sensor loop which receives a portion of light supplied from an optical source and recirculates it through a pair of couplers, to an output line connected to a photo detector. This reference does not disclose an array of fiber-optic power dividers as used in the present invention, with time delays for producing a time to space domain intensity separation.

SUMMARY OF THE INVENTION

Thermometry by time domain intensity transmission (TDIT) is an alternative method for multiplexing several discrete temperature measurements. This technique is characterized by an improved signal-to-noise ratio compared to optical time domain reflectometry and utilizes fewer optical fibers than an array of independent discrete sensors, used in multiple point discrete temperature sensing.

The transmission of light through optical fiber is dependent on fiber temperature. This dependence is especially pronounced at unfused fiber splices where light from one input fiber is coupled to two output fibers. The light transmission characteristics (splitting ratios) at this butt splice are impacted by thermal expansion of the spliced connection. This effect is predictable and repeatable and provides the basis for the TDIT thermometry technique.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTIONS OF THE DRAWINGS

DESCRIPTION OF THE PREFERRED EMBODIMENTS

Figure 1:
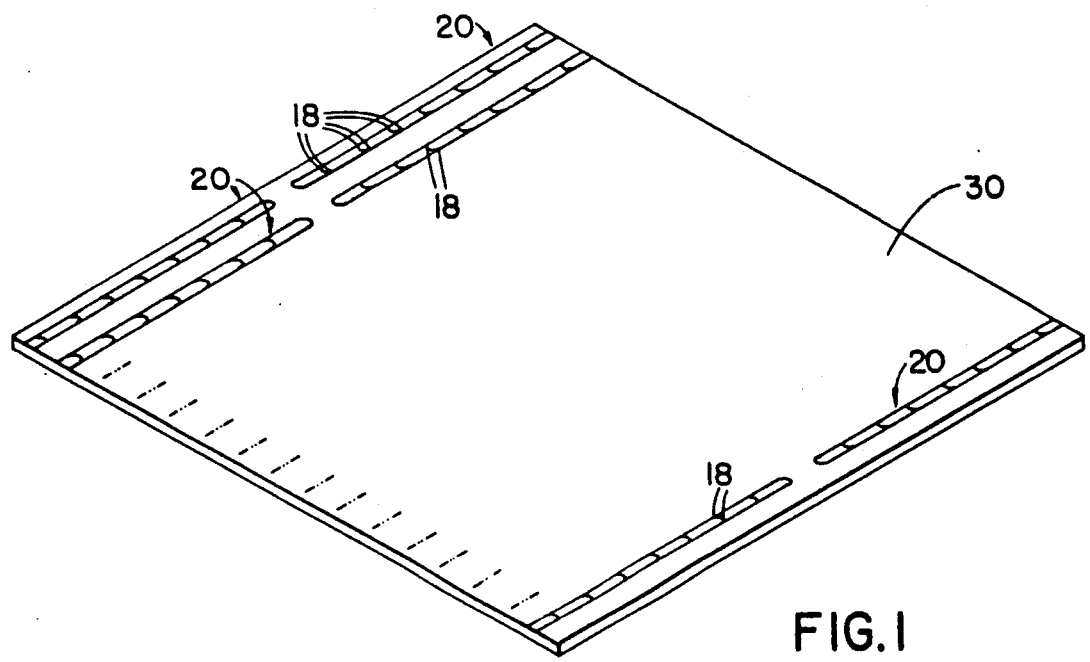
FIG. 1 is a partial perspective view of the inside surface of a skin which is provided with an array of temperature detectors used in accordance with the present invention.

Referring to the drawings in particular, the invention embodied therein comprises an apparatus and method for measuring temperature over a very broad area, such as the inner surface of an airfoil skin 30 shown in FIG. 1. The airfoil 30 carries a plurality, in this case 32, networks generally designated 20 which produce a 3"×3" resolution.

Figure 2:
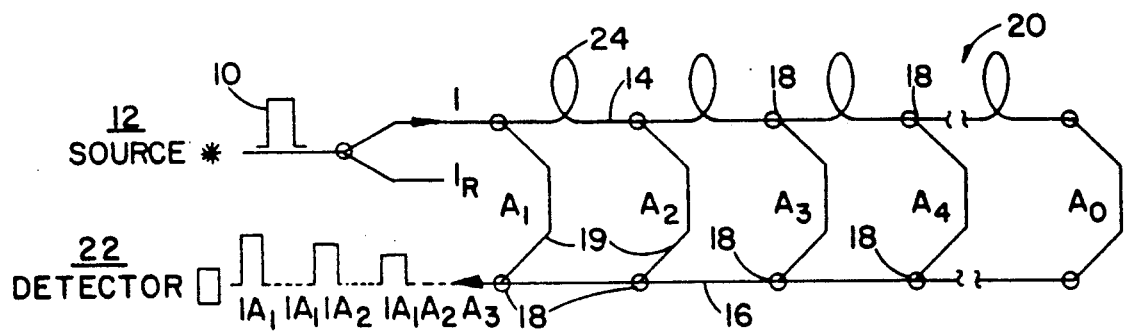
FIG. 2 is a schematic representation of a single time domain transmission network for use in the array shown in FIG. 1.

FIG. 2 shows the construction of each network 20. A light pulse 10 of about 2 ns duration is launched from a light source 12 into an output bus 14 of the TDIT sensor network 20. The pulse intensity is monitored through the output of a power divider. For simplicity, it is assumed that the reference intensity $I_R$ is equal to the intensity I, which is transmitted to the network. FIG. 2 depicts an additional fiber optic power divider immediately following the light pulse (10) with one of the legs being connected to the input leg of the initial first power divider in the output bus. A fiber optic reference $I_R$ is connected to the other output leg for calibrating the intensity of light pulses supplied from the light source to the output bus. This network consists of the output bus 14 and a receiving bus 16 which are linked by pairs of 1×2 fiber optic power dividers 18. Each pair of power dividers is connected by a fiber optic bridge 19 and is placed in thermal contact with a location to be measured, and this defines the temperature sensing points shown in FIG. 1.

At the first temperature sensing point $A_1$ in FIG. 2, a fraction of the incident pulse intensity passes through the two fiber optic power dividers and returns to a detector 22. The remaining light in the output bus 14 passes through a delay coil 24 (e.g. one meter of optical fiber) to the second pair of power dividers. The return pulse from the second sensing point $A_2$ is delayed in time by about 5 ns from the first returning pulse from the $A_1$ sensing point. Similarly a fraction of the input light pulse intensity is returned to the detector from each successive sensing location, spaced in time at 5 ns intervals.

As indicated in FIG. 1, up to eight sensing points could be accessed in one TDIT network. The corresponding dynamic range required for light intensity measurement is $-60$ dB. In a typical application, coverage of a 16 ft$^2$ panel area with $3'' \times 3''$ spatial resolution would require 256 sensing points. Thus, 32 networks 20 each with eight channels like the one shown in FIG. 2 would be required for total coverage of the inner skin of an airfoil 30, for example, as shown in FIG. 1.

The series of return pulses are sampled sequentially using a clock reference. The intensities measured ($I_{o1}, I_{o2}, ... I_{on}$) by the detector are related to the sensing point temperatures. The return pulse from each sensing point (FIG. 2) is attenuated by the transmission factor ($A_n$) for that power divider pair and each preceding pair. The transmission factor for each sensing point is ratiometrically obtained in an iterative manner, where the intensity value for the previous sensing point is used to normalize the intensity of the successive sensing point.

Figure 3:
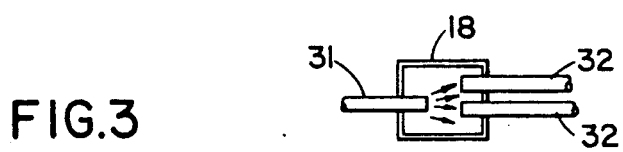
FIG. 3 is a schematic representation of a power divider used in the network of FIG. 2.

Each transmission factor, $A_n$, consists of a temperature independent term, $L_n$, plus a temperature dependent term, $R_n(T)$. This dependence results from the dependence of the splitting ratio for the fiber optic power dividers 18 on temperature. Both transmission terms are repeatable for an individual power divider pair and are determined by calibration. If each power divider has 0.45/0.45 transmission from its input leg 31 to the output legs 32 as shown in FIG. 3, at ambient temperature, then the transmission through the pair at the sensing points is about $0.20 = (0.45)^2$.

Figure 4:
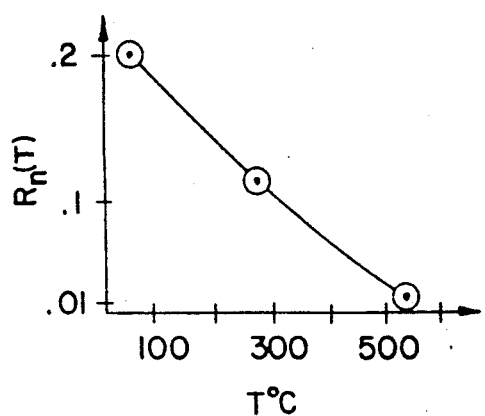
FIG. 4 is a graph plotting a temperature dependent term in an equation which reflects the operation of the present invention, against temperature.

Using one of several different fabrication methods, the transmission ratio, R in FIG. 4 through the pair of power dividers can be made to decrease with temperature to about 0.01 at 540° C. Over the temperature measurement range, the total change in transmission ratio is about 0.19, which can be measured with a repeatability of $\pm 0.005$ using intensity pulse height sampling and averaging. Thus, the temperature measurement repeatability is expected to be $540 \times [0.005/0.19] = \pm 14°$ C.

Each TDIT sensing network could be normalized at aircraft start-up and triggered automatically to correct loss $L_n$ at isothermal conditions.

Using the calibration data for $L_n$ and $R_n(T)$, transmission factors and temperatures for each sensing location are ratiometrically computed from the following relations:

where the intensity value for the previous sensing location is used to normalize the intensity for the succeeding location.

The length of coverage for a single TDIT sensor network is limited by the dynamic range required for the light intensity measurement ($-60$ dB), the intensity loss at each power divider, and the spatial resolution required for the temperature measurements.

Advantages of TDIT compared to ultrasonic thermometry are: Light-weight optical fiber waveguides compared to metal ultrasonic waveguides and lower cost electronics.

Advantages of TDIT compared to optical time domain reflectometry are: lower cost electronics; electronic blanking to suppress detector saturation not required; improved signal to noise ratio; and operation in transmission mode eliminates noise resulting from backscattered light when operating in reflection mode.

Advantages of TDIT compared to multiple point discrete sensors are: less optical fiber required and use of fiber optic power dividers/couplers as the primary sensing elements rather than silicon films.

With the method shown in FIG. 1 and 2, $3'' \times 3''$ spatial resolution for each standard 16 square foot ($4' \times 4'$) panel is achieved by 32 TDIT optical sensor networks attached to the inner panel surface. Each network is configured with eight temperature sensitive optical power divider pairs. Each pair returns a fraction of the input pulse intensity, a function of the pair temperature, to the optical detector.

Each optical power divider must be in thermal contact with the panel surface; embedded or bonded installations are conceptually equivalent. For a bonded installation, the networks may be attached directly to the panels after fabrication.

Rather than unfused fiber butt splices shown in FIG. 3, other methods could serve as temperature sensitive fiber optic power dividers. These other well known methods include surface waveguide evanescent couplers or thermo-mechanical amplification provided by laying butt-coupled fibers onto bimetallic strips.

While a specific embodiment of the invention has been shown and described in detail to illustrate the application of the principles of the invention, it will be understood that the invention may be embodied otherwise without departing from such principles.

What is claimed is:

1. An apparatus for sensing temperature, comprising:
   at least one fiber optic time domain intensity transmission network having an output bus with a plurality of first fiber optic power dividers spaced therealong, each first fiber optic power divider having one input leg and two output legs, said network including a fiber optic delay line between each first fiber optic power divider for delaying the light signal from one first power divider to the next $$A_1 = I_{o1}/I_R, I = I_R, A_1 = L_1 + R_1(T),$$

$$A_2 = I_{o2}/(I_R(1 - \sqrt{A_1})), I = I_R, A_2 = L_2 + R_2(T),$$

$$A_3 = I_{o3}/(I_R(1 - \sqrt{A_1})(1 - \sqrt{A_2})), I = I_R, A_3 = L_3 + R_3(T),$$

$$A_4 = I_{o4}/(I_R(1 - \sqrt{A_1})(1 - \sqrt{A_2})(1 - \sqrt{A_3})), I = I_R, A_4 = L_4 + R_4(T),$$

along said output bus, said network further including a receiving bus with a plurality of second fiber optic power dividers spaced therealong, each second power divider comprising two input legs and one output leg, a plurality of fiber optic bridges each connected between one output leg of a first power divider in said output bus and one input leg of a second power divider in said receiving bus, the input leg of the initial first power divider in said output bus comprising an input for said output bus and the output leg of the final second power divider in said receiving bus comprising the output of said receiving bus, each of said first and second power dividers being adapted to be in thermal contact with a surface whose temperature is to be sensed, wherein said first and second power dividers and said fiber optic delay line are used to produce a time to space domain intensity separation;

a light source for supplying light pulses to the input of said output bus; and a light detector for receiving a train of light pulses from the output of said receiving bus and measuring intensities thereof, the train of light pulses being modified as a function of the temperature of the surface which modifies transmission of light across said power dividers as an indication of temperature for the surface.

2. An apparatus according to claim 1, wherein each power divider comprises a fiber optic splice.

3. An apparatus according to claim 2, wherein each fiber optic splice comprises an unfused butt splice.

4. An apparatus according to claim 3, including an additional fiber optic power divider having an input leg connected to said light source and two output legs, one of said output legs being connected to the input leg of the initial first power divider in said output bus, and a fiber optic reference connected to the other output leg of said additional power divider for calibrating the intensity of light pulses supplied from said light source to said output bus.

5. An apparatus according to claim 1, wherein said network include eight first power dividers connected to eight second power dividers by eight fiber optic bridges.

6. An apparatus according to claim 1, including a plurality of said networks arranged on a surface whose temperature is to be sensed, said networks extending parallel to and adjacent each other with each power divider being in thermal contact with the surfaces.

7. A method of sensing temperature on a surface, comprising:

placing a plurality of first fiber optic power dividers in thermal contact and at spaced locations along the surface;

placing a plurality of second fiber optic power dividers in thermal contact and at spaced locations along the surface;

each first divider having one input leg and two output legs, each second power divider having two input legs and one output leg;

a fiber optic bridge connecting one output leg of each first power divider with one input leg of a respective second power divider;

connecting one output leg of each first power divider by a fiber optic delay line to the input leg of a subsequent first power divider to form an output bus and the one output of each second power divider being connected to one of the inputs of a subsequent second power divider to form a receiving bus, wherein said first and second power dividers and said fiber optic delay line are used to produce a time to space domain intensity separation;

applying a light pulse to the input leg of an initial first power divider in said output bus for propagation along said output bus and for dividing a portion of the signal to each bridge for return on said receiving bus; and detecting a train of light pulses at the output leg of a final second divider in said receiving bus, the train of light pulses being modified as a function of the temperature of the surface which modifies transmission of light across said power dividers as an indication of temperature for the surface.

* * * * *